United States Patent

[11] 3,585,344

| [72] | Inventors | Hans Heymann;<br>Hans Rottmann, both of c/o Messer Griesheim GmbH Frankfurt am Main, Hanauer Landstr. 300, Germany |
|---|---|---|
| [21] | Appl. No. | 10,979 |
| [22] | Filed | Feb. 12, 1970 |
| [45] | Patented | June 15, 1971 |
| [32] | Priority | Apr. 20, 1966 |
| [33] | | Germany |
| [31] | | M69208 |
| | | Continuation of application Ser. No. 632,322, Apr. 20, 1967, now abandoned. |

[54] BAND WELDING MACHINE
14 Claims, 9 Drawing Figs.

[52] U.S. Cl. .................................................. 219/82, 219/81

[51] Int. Cl. .................................................. B23k 11/06
[50] Field of Search .................................... 219/81, 82, 83

[56] References Cited
UNITED STATES PATENTS

| 3,102,189 | 8/1963 | Jones et al. | 219/82 |
| 3,235,703 | 2/1966 | Seeloff et al. | 219/82 |
| 3,256,419 | 6/1966 | Taylor et al. | 219/83 |

Primary Examiner—J. V. Truhe
Assistant Examiner—Hugh D. Jaeger
Attorney—Connolly and Hutz ABSTRACT: Opposite ends of a pair of coils are clamped together by clamping means in the carriage of the band welding machine. The ends are cut during the forward movement of the machine carriage and are welded together during its return or backward movement to join the coils together at the welded seam.

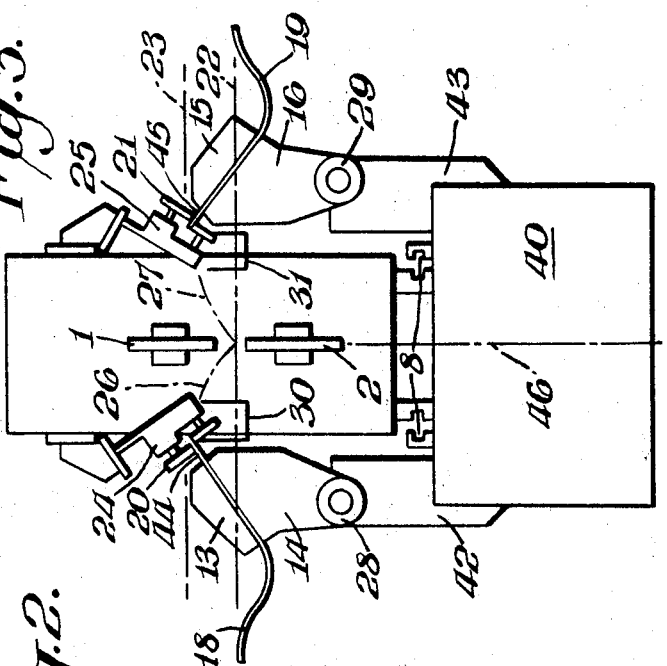
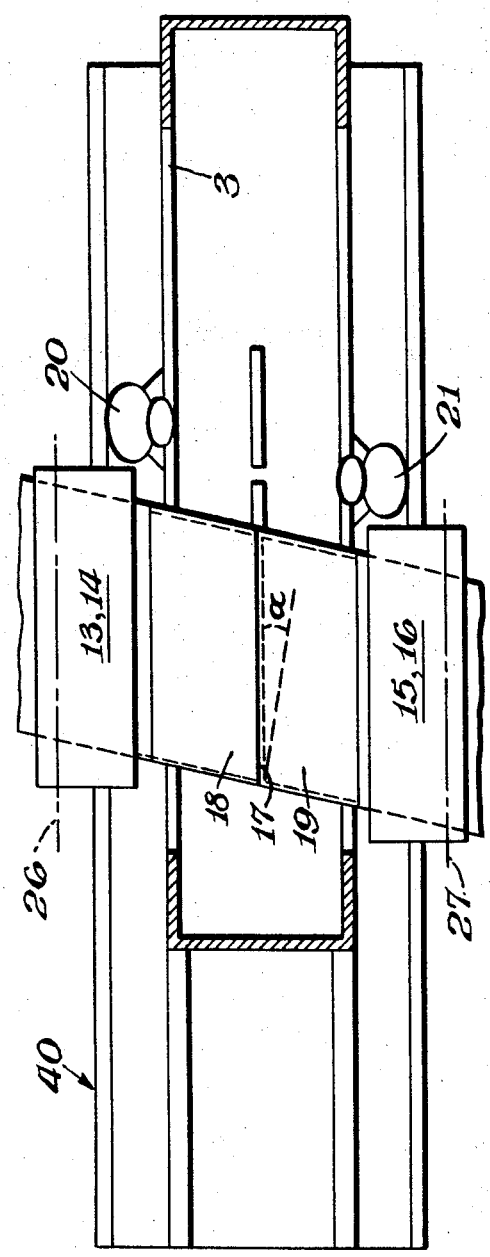
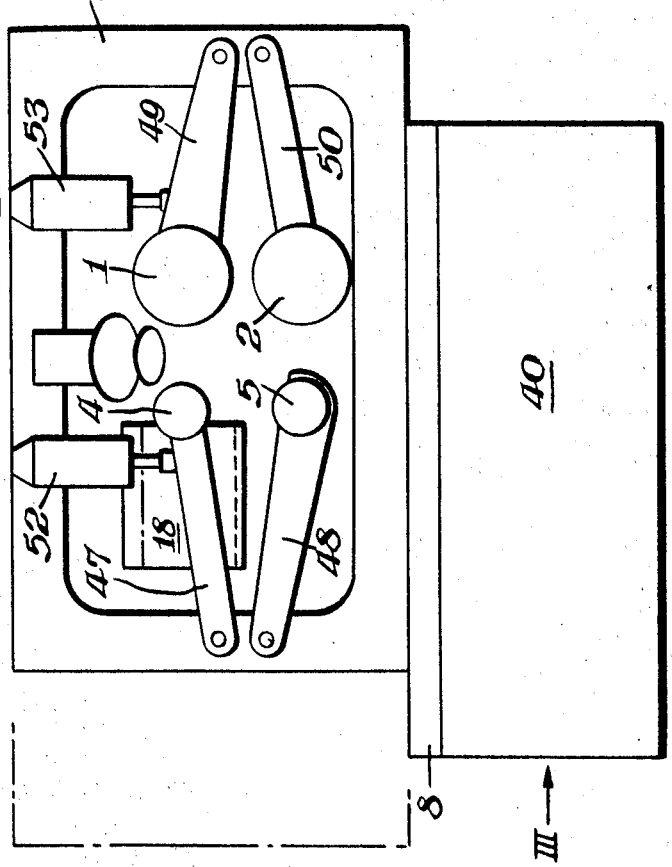

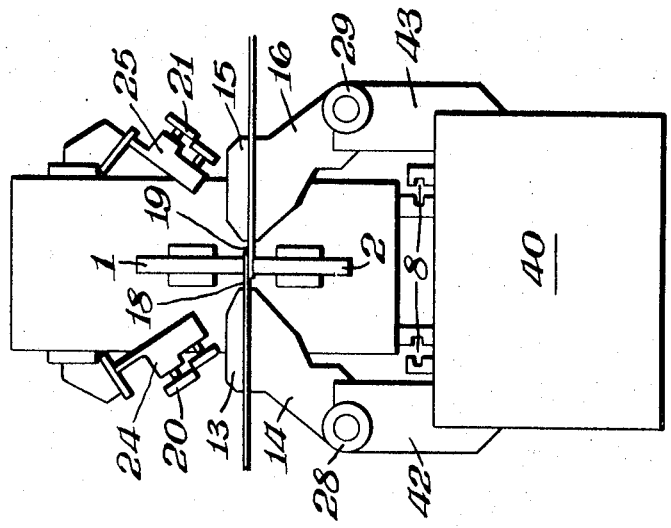
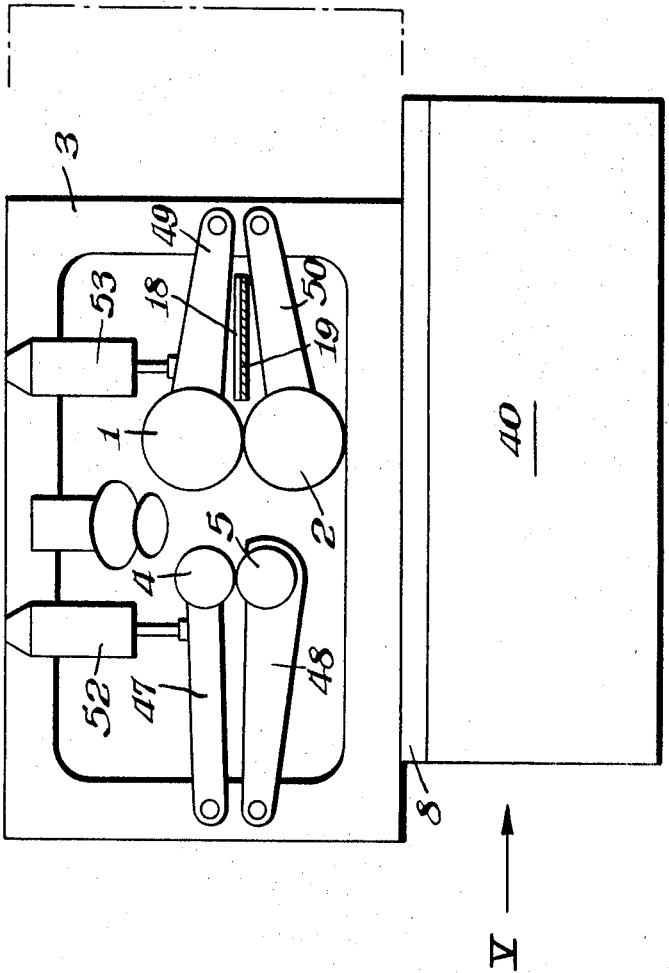

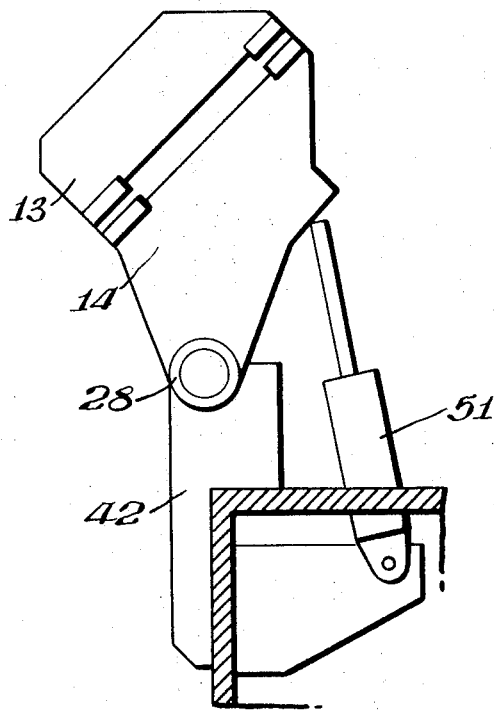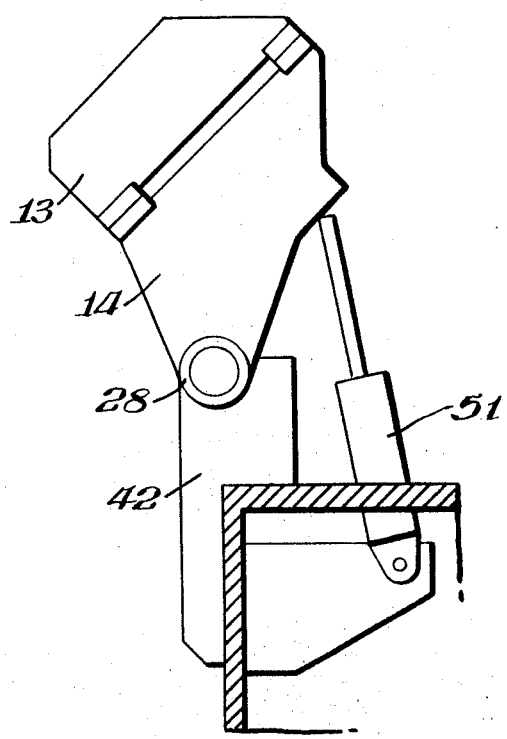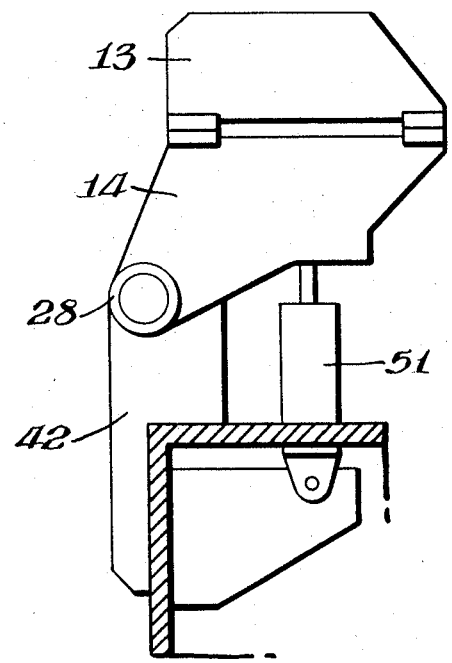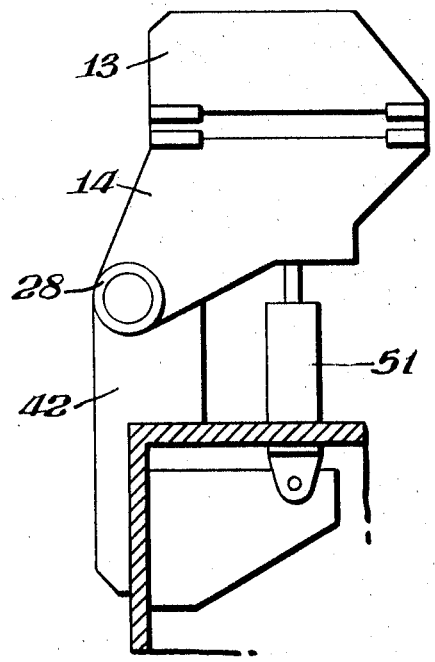

BAND WELDING MACHINE

CROSS-REFERENCE TO RELATED APPLICATION

This application is a continuation of copending application Ser. No. 632,322, filed Apr. 20, 1967 now abandoned.

BACKGROUND OF THE INVENTION

Band welding processes are employed, for example, for the welding together of steel bands in cold milling trains. When a coil is unrolled, the band end of this coil is welded with the band beginning of a following coil, so that there results a continuous band.

In a band welding machine of the type disclosed in German Pat. No. 1,129,638, the band ends in the welding or band plane are seized by two clamping jaw pairs and levelly cut by a double impact shears. Then they are seized by the mashing rollers and pushed together until they overlap the levelly cut band ends. Next the carriage is moved from its one end position, in which the double impact shears are located in their operating position, to the other end position. In this connection, welding electrodes, provided as the welding means, and subsequently the mashing rollers roll over the seam of the band ends and complete the welding or the pressing together of the seam location. After this has occurred, the carriage is returned, while the welding and mashing rollers are disengaged, into its starting position in which the double impact shears are located in operating position for the next level cutting step. The carriage of this known band welding machine must be brought back to its starting position during idling and must carry out during the operating run, such a stroke that first the means are removed from the welding range, which would otherwise be interfering in the welding process, and then the welding means are conducted over the band ends. The operating stroke and therefore also the idling must be adjusted to be greater than would be required for the carrying out of the welding process. Since the carriage and its conduction means must be constructed very sturdily because of the considerable weight of the cutting means, the conduction means, because of the great impetus, are correspondingly bulky. The impetus of the carriage also determines the space which is needed by the band welding machine in the width, i.e. across the longitudinal axis of the band ends.

BRIEF DESCRIPTION OF INVENTION

A object of this invention is to construct a band welding machine of the initially named type in such a manner that the movement of the carriage is utilized as much as possible, particularly in that an empty return pass is substantially avoided.

The invention is characterized by having the cutting means effective only during a carriage forward move and the welding means only during a carriage return move. According to invention, the cutting process takes place during the carriage forward move and the welding process during the carriage return move. Idling of the carriage in order to bring this back to its starting position is not necessary; at most a short idling portion. The impetus of this carriage movement then requires, apart from small, insignificant oncoming and outgoing range, to extend only once over the bandwidth of the band ends to be welded together.

In the interests of small oncoming and outgoing widths, cutting means are desirable which are of small measurements as seen in the direction of the seam (referred to hereinafter as the longitudinal measurement). The corresponding longitudinal measurement of the double impact shears in the known, described band welding machine is at least as large as the width of the band ends. A particularly small longitudinal measurement results when the cutting means are constructed as roller shears according to a suitable further development of the invention described in our copending application. These roller shears then carry out the cut while the carriage carries out its forward move. In order to carry out the cut, it is sufficient to have a carriage forward move in which the roller shears, originating from a position forward of the longitudinal edges of the band ends, are conducted over the band ends once into a position behind the other longitudinal edges of the band ends. In both end positions both roller shears are disengaged with the band ends. The carriage impetus must therefore be somewhat wider for the cutting process than the width of the band ends so that the roller shears before and after the cutting process are disengaged from the band ends. However, because of the small longitudinal measurement of the roller shears, this requires only very small path values, namely somewhat more than half of the roller diameter.

The same principles hold also true for the welding means. If the roller shears are arranged at the level of the welding means, referring to the carriage passage direction, then the passage parts do not accumulate for the disengagement of the welding means and the cutting means at both ends of a carriage impetus. These passage parts are furthermore determined by the longitudinal measurement of the larger means— the welding means or the cutting means.

The welding means are suitable welding rollers, just as in the initially mentioned known band welding machine, to which mashing rollers are after switched, which in turn are activated only during the carriage return move (welding process). The mashing rollers in this case belong to the welding means and serve to press the welded seam flat to about the single thickness of a sheet. The longitudinal measurement among others for the welding rollers and after switched mashing rollers is determined by the axis spacing of the welding rollers to the mashing rollers. The cutting means are preferably arranged in the range of this spacing, and particularly outside the welding plane in the cutting plane. By the arrangement in the middle of the axis interval the oncoming and outgoing course of the roller shears are the same and the shortest at both sides.

The cutting means must be so arranged or so constructed that they do not interfere with the welding process and thus cannot be damaged. For this purpose, the roller shears can be removed out of the way upwards instead of to the side. This is not particularly bulky, since roller shears in contrast to impact shears can be very light and small. In order to carry out a cut, no special impact impetus is required as the impact shears, so that corresponding conducting means with respect to roller shears, in contrast to impact shears, are not necessary here as in the known band welding machine.

A preferred embodiment of the invention, however, goes another way which results in a particularly simple constructive and conveniently handled embodiment. This further construction is characterized in that the cutting means are arranged in a cutting plane outside the welding plane and in that clamping means are provided for the band ends which are displaceable from the cutting plane.

In the known described band welding machine, the cutting process and the welding process takes place in a plane, namely the band plane which is also the welding plane and the cutting plane. In devices according to this further development of the invention, the cutting plane is outside the welding plane, preferably above the welding plane; although it can also be situated under the welding plane. It is sufficient then, to make the clamping means, which hold the band ends during the cutting process and during the welding process, movable from one plane to the other. The clamping means in this connection can be so movable that they remain parallel in both positions, referring to their clamping plane. It is simpler, however, to construct the clamping jaw pairs swingable about rotating axes which extend parallel to the seam. The clamping jaw pairs are then located in the welding position, referring to their clamping plane, aside from any insignificant displacement because of the overlapping of the band ends in the welding plane. In the cutting process, however, the clamping means extend with reference to their clamping planes at an angle to each other. Both band ends as a result are bent upwards or downwards in the cutting position of the clamping means. This arrangement has no disadvantages for carrying out the cutting process with roller shears. The arrangement is more advantageous, however, for the construction of the movable clamping means, because rotating supports are considerably more easily constructed than lift supports.

Furthermore, it is simpler to clamp by hand the relatively heavy band ends into the clamping means whose clamping surfaces are bent at an angle downwards or upwards.

BRIEF DESCRIPTION OF DRAWINGS

FIG. 1 is a plan view of one embodiment of this invention in the starting position;

FIG. 2 is a side view of FIG. 1 with parts removed for the sake of clarity;

FIG. 3 is an end view according to Arrow III of FIG. 2;

FIG. 4 is a view similar to FIG. 2 but in the other end position of the carriage after completion of the cutting process and prior to the welding process;

FIG. 5 is a view according to Arrow V of FIG. 4;

FIG. 6 is an elevational view of a clamping jaw pair of FIG. 3 in the cutting position and opened for the insertion of a band end;

FIG. 7 shows the clamping jaw pair of FIG. 6 in the cutting position and closed;

FIG. 8 shows the clamping jaw pair of FIG. 6 in the welding position and closed for the carrying out of the welding process; and FIG. 9 shows the clamping jaw pair of FIG. 6 in the welding position, but opened, so that the band ends welded together can be pulled through.

DETAILED DESCRIPTION

In the drawing, a basic cradle is designated with 40 upon which a carriage 3 is movable supported in a carriage conduit 8. The carriage 3 (as seen in FIG. 2) has the form of a rectangular frame. The upper parts of the carriage 3 are shown cut off in FIG. 1 for the sake of clarity.

As particularly seen in FIG. 3, at each carrier 42, 43 on the base cradle, there are linked two clamping jaw pairs 13, 14 and 15, 16. The rotating support for the clamping jaw pairs 13, 14; 15, 16 are designed with 28 and 29. The axes of rotation 26, 27 (FIG. 1) of the rotating support 28, 29 extend in a horizontal direction parallel to each other and vertical to the drawing plane of FIG. 3. The clamping jaw pairs 13, 14 and 15, 16 serve for the receipt and for securing of both of the band ends 18, 19 to be welded together in an overlapped manner. These ends of bands 18, 19 are for example the ends of steel bands. The one band end 19 is the end of a terminating coil, while the other band end 18 is the beginning of a new coil. Both band ends are connected together during the course of a rolling train processing, so that both bands can be pulled continuously through the rolling train.

The band welding machine according to the invention as shown by FIG. 1 is at a small angle $a$ transversely against the passage direction of the steel band, since it is desirable that the welding seam does not extend at right angles to the longitudinal direction of the steel band but be disposed at a certain angle $a$ thereto so that the seam does not enter with its entire width simultaneously into the subsequent roller pair and processing devices.

The effective width of the clamping jaw pairs 13, 14; 15, 16 is somewhat larger because of tolerance reasons than the distance between the two band edges resulting from this sloping position. According to the sloping conduction of band ends 18, 19 as seen in FIG. 1, the clamping jaw pairs 13, 14; 15, 16 are arranged displaced relative to each other, so that the band ends can essentially be clamped centrally in the clamping jaw pairs 13, 14; 15, 16.

The clamping jaw pairs 13, 14; 15, 16 are swingable from a welding position limited by stops, as shown in FIG. 5, to a cutting position also limited by stops as seen in FIG. 3.

In the welding position, the clamping planes of the clamping jaws extend in the welding plane 22, preferable of the band plane, that is the plane in which the steel band would normally be conducted and in which the welding takes place. In the cutting position, the clamping planes are at an angle opened downwards.

Clamping jaw pairs 13, 14; 15, 16 are shown in the cutting position in FIG. 1 as well as in FIG. 3. Band ends 18, 19 are shown clamped in FIG. 3 and as a result are bent upwards from the welding plane 22 in which they are normally clamped. The are clamped in the clamping jaw pairs in such a manner that they protrude with their free ends from the clamping jaw pairs on the inner side. On this processing strip occurs the processing (i.e. the level cutting, the welding, and the plane rolling) of the seam. The processing strips 44, 45, extend in the cutting position of the clamping jaw pairs 13, 14; 15, 16 transversely upwards at the level of a cutting plane 23.

Two roller shear pairs are designated with 20, 21 each of which are supported on a supporting frame 24, 25. Each roller shear pair consists of two shear rollers, of which one acts as a knife and the other as a counterknife. The shear rollers are mounted turnable with a special drive for the shear rollers generally not being provided. The supporting frames 24, 25 are movable along the accompanying clamping jaw pair 13, 14; 15, 16, referring to the cutting position of this clamping jaw pair. The roller shears 20, 21 are so arranged and adjusted that by the movement of the roller shear carriage the processing strips are levelly cut with the obtainment of residual processing strip protruding from the clamping jaw pair. The size of this residual processing strip can be adjusted by corresponding adjustment of the supporting framed 24, 25 or roller shear pairs 20, 21.

Both roller shear pairs 20, 21 are, as seen in FIG. 1, arranged displaced to each other on the same basis as the clamping jaw pairs 13, 14; 15, 16, in order to be able to cut the band ends with the consideration of the inclined band passage. Below each roller shear pair 20, 21 there is provided at carriage 3 a receiver container 30, 31 for the trimmings.

Two welding rollers 1 and 2 and two mashing rollers 4 and 5 are turnably supported at carriage 3 at the free ends of swinging levers 47—50, and in such a manner that the median planes of these rollers 1, 2, 4, 5 are situated in the mirror symmetric plane 46. The axes of the welding rollers 1, 2 lie vertical over each other as do the mashing rollers 4 and 5.

The welding rollers 1, 2 and the mashing rollers 4, 5 can take a rest position in which they do not touch each other according to FIGS. 2 and 3 and from there are swung into an operating position in which they touch each other in the welding plane in accordance with FIGS. 4 and 5.

The welding rollers and mashing rollers together form the welding device. The welding rollers connect the overlapped band ends on an inductive passage, and the mashing rollers equalize the overlapping on the band thickness.

The distance between the welding rollers 1, 2 and the mashing rollers 4, 5 determines, together with the speed at which the carriage 3 is propelled during the welding process, the size of the time interval which passes between the welding process and the subsequent mashing process. This time span is chosen by corresponding measurement of this distance between the welding rollers and the mashing rollers and the conveying speed of the carriage during the welding process, in such a manner that the mashing process takes place outside the blue brittleness range.

The carriage is pushed one time one way and another the other way on the carriage guide 8 during each welding process, and namely from the position according to FIG. 2 to the position according to FIG. 4 and back. A drive unit serves to drive the carriage which is accommodated in the basic cradle and is not shown for the sake of clarity.

For the activation of the clamping jaw pairs there are provided hydraulic drive means. The hydraulic drive means for closing and opening the clamping jaw pairs are also not shown for the sake of clarity. The hydraulic drive means for deviating of the clamping jaw pairs illustrated in FIGS. 6—9 are shown in these figures and are designated by 51. They are, however, not shown in FIGS. 1—5.

The welding rollers 1, 2 and the mashing rollers 4, 5 normally are located in the rest position seen in FIG. 2 and only with the carrying out of the welding are they located in the operating position illustrated in FIG. 4. They are moved from one position to the other by hydraulic drive means. These hydraulic drive means are shown in FIGS. 2 and 4 for the upper rollers and designed by 52, 53. Those for the lower rollers are constructed exactly the same, but are not shown for the sake of clarity.

For controlling the diverse drive means there is provided a central controlling mechanism which is manually activated for a complete welding cycle and has limit switches for the end positions of the diverse parts to be moved, particularly carriage 3. This controlling mechanism and the limit switches as well as the accompanying driving powers are not shown also for the sake of clarity.

The mode of operation is as follows: With the operation of the rolling train, in which is located the band welding apparatus illustrated, a steel band, in the sloping position in which the band ends 18, 19 are illustrated in FIG. 1, runs through between the clamping jaws of the opened clamping jaw pairs located in the welding position. This steel band runs along the welding plane 22, shown by dotted lines in FIG. 3. The welding rollers 1, 2 and the mashing rollers 4, 5 are located here in their rest position illustrated in FIG. 2, and the carriage 3, as illustrated in FIG. 2, is moved to the side of the welding rollers in its end position. The band welding apparatus remains inactive in this position until the uncoiling band comes to the end. If band end 19 of the unrolling coil is located in the range of the inventive machine, then the band end is held secure by clamping jaws 15, 16. The processing of the band in the milling train is not interrupted, since the terminating band behind the welding apparatus has an inoperative adjusting length. Then a band end 18—or more correctly a band beginning—of a new coil is pulled up to the band welding machine, so that this band end extends in the inclined position in the elongation of the terminated band end 19, illustrated in FIG. 1. Both opened clamping jaw pairs are moved into their cutting position, according to FIG. 6. Then both band ends 18, 19 are manually inserted into the clamping jaw pairs 13, 14; 15, 16, and the clamping jaw pairs are closed (FIG. 7). The band ends are now located in the position shown in full in FIG. 1 and illustrated in FIG. 3. In FIG. 2 the clamping jaw pairs are not shown, but the band end 18 turned away from the viewer is shown in this position. In this position the processing strips 44, 45 protrude in the front from the clamping jaws into the operating range of the roller shears 21 or into the cutting plane 23. After the clamping jaws have clamped the band ends in the cutting position, carriage 3 is set in motion and is conducted from its end position, according to FIG. 2, into its end position, according to FIG. 4, the welding rollers 1, 2 and the mashing rollers 4, 5 remaining inactive and the cutting rollers 20, 21 cutting levelly both of the processing strips along the clamping jaw pairs, so that there still only protrude relatively short processing strips from the clamping jaws. As a result of the displaced arrangement of the roller shears 20, 21 corresponding to the inclined position of both band ends, according to angle $a$ of FIG. 1, both roller shears 20, 21 are simultaneously started with the cutting and also complete the cutting simultaneously. The strips cut off here fall into the receiving container 30, 31. At the end of this carriage run the band ends are levelly cut and the welding rollers 1, 2 are located on the other side of the edge of the band ends and still in the rest position illustrated in FIG. 2.

After the cutting process the clamping jaw pairs are moved from their cutting position, shown in FIG. 3, into the welding position shown in FIGS. 5 and 8. The clamping jaw pairs 13, 14; 15, 16 and their rotating supports 28, 29 are so measured and arranged that the levelly cut edges make arcs as shown in FIG. 3, which cross somewhat above the welding plane. The welding rollers 1, 2 extend so far over the band range that the levelly cut edges of the band ends in this swinging process cannot touch the welding rollers. The rotating movement of the clamping jaw pairs 13, 14 to the welding position takes place somewhat later than that of the clamping jaw pairs 15, 16, so that both cut edges of the band ends cannot bump against each other but instead come to overlap in the cutting plane 22 as seen from FIG. 5.

The clamping jaw pairs 13, 14; 15, 16 are so constructed and supported that in the rotating movement from the cutting position to the welding position exerts a pull on the band ends 18, 19. Hence both band ends are here slightly tightened up. The clamping jaw pairs can also be so constructed and supported that no tightening up results. Although not recommended, one could also support them in such a manner that the band ends are pushed back in this swinging process.

The size of the overlapping, aside from the constructive formation of the clamping jaw pairs 13, 14; 15, 16—as already mentioned above—can also be determined by the position of the roller shears 20, 21. It can be set to a certain value in that the supporting frames 24, 25 of the roller shears are accordingly adjusted against the respective band ends, i.e. in the drawing plane of FIG. 3. Supporting frames 24, 25 are preferably so adjusted that there results an overlapping of one to 1½ fold band strength.

The overlapping band ends extend in the welding plane 22 in the welding position, and the welding rollers 1, 2 are located, as seen from FIG. 4, close to these band ends, but not yet in contact with them. The welding rollers 1, 2 are now brought into their operating position according to FIG. 4, just as the mashing rollers, 4, 5, which are pressed against each other by suitable pressure. The named rollers contact each other in the welding plane. In this position of the rollers carriage 3 is moved from the position, according to FIG. 4, back to its starting position, according to FIG. 2, and completes the so-called carriage return run. In this connection, the welding rollers 1, 2, which are acted upon with voltage, roll over the band ends which overlap each other, so that there forms a welding seam 17 according to FIG. 1. Subsequently, the mashing rollers, 4, 5 roll over the still warm welding seam and mash this together to about a single steel plate strength. The carriage runs in both directions with constant speed. The carriage forward move follows because of time reasons at a higher speed, for example about 6 meters per minute—than the carriage return move. At a carriage return move speed of about 2 meters per minute the welded places can cool off only to a temperature above the blue brittleness range as a result of the small distance between the welding rollers and the mashing rollers, so that the mashing rollers are activated in a temperature range above the blue brittleness range without requiring for this a special heat supply outside the welding place.

At the end of the carriage return move, the welding rollers, 1, 2 are brought in its rest position together with mashing rollers, 4, 5, as seen in FIG. 2. The carriage return move is so measured that the welding rollers and the mashing rollers in their operating position run along the entire seam 17.

The seam welding is now completed. The clamping jaw pairs 13, 14; 15, 16 are now opened keeping their welding position (FIG. 9), and the welding location can be further conveyed by the rolling train. In this connection the band end 19 pulls over the band end 18 (the band of the next coil) through the rolling train, and the band welding machine is located in its starting position.

It is pointed out that carriage 3 completed in each welding process a forward and return move. During the carriage forward move only the roller shears 20, 21 are in operation, and during the carriage return move, welding rollers 1, 2 and mashing rollers 4, 5 are in operation. The carriage stroke is so measured that in both end positions the mashing rollers, 4, 5 and the welding rollers 1, 2 are next to the band ends. The roller shears 20, 21 then, because of their arrangement in the middle of the common effective width of the mashing rollers and the welding rollers, also stand next to the band ends. The carriage stroke is, in the interest of a narrow construction and a small lateral space requirement of the band welding machine, so measured that these requirements are fulfilled exactly with the necessary tolerances.

What we claim is:

1. A band welding machine for connecting band ends along a seam disposed across the longitudinal direction of the bands comprising a movable carriage having a forward movement and a return movement, cutting means mounted upon said carriage for the level cutting of the band ends, welding means mounted upon said carriage for the joining together of the band ends, said cutting means being connected for operation solely during said forward movement of said carriage, and said welding means being connected for operation solely during said return movement of said carriage.

2. A machine as set forth in claim 1 wherein said cutting means includes roller shears.

3. A machine as set forth in claim 2 wherein said roller shears are disposed at the same height as said welding means with respect to the direction of movement of said carriage.

4. A machine as set forth in claim 1 wherein said welding means includes welding rollers.

5. A machine as set forth in claim 1 wherein mashing rollers are mounted on said carriage, and said mashing rollers being connected for operation solely during said return movement of said carriage.

6. A machine as set forth in claim 1 wherein said cutting means are connected for operating in a cutting plane, said welding means being on said carriage for holding the band ends, and said clamping means being movable to and from said cutting plane and said welding plane.

7. A machine as set forth in claim 6 wherein said clamping means include clamping jaw pairs swingable about axes parallel to the seam.

8. A machine as set forth in claim 7 said cutting means includes roller shears, said welding means including welding rollers disposed at the same height as said roller shears, mashing rolls being mounted on said carriage, and said mashing rollers being connected for operation solely during said return movement of said carriage.

9. A strip welding machine for welding together the ends of separate bands to form a single continuous band therefrom, with said band being movable in a band passage and welding plane, comprising a cradle, two pairs of clamping jaws for holding the ends of the bands therein, each of said pairs of clamping jaws being pivotally connected to said cradle, said clamping jaws being movable together with the band ends out of said band passage and welding plane into a cutting position and back to an overlapped welding position, a carriage movable on said cradle in a direction transverse to the direction of band travel, cutting means mounted on said carriage, welding means and mashing means mounted on said carriage, said carriage being mounted for forward movement and for return movement, said cutting means being connected for operation solely during said forward movement, and said welding means and said mashing means being connected for operation solely during said return movement.

10. A machine as set forth in claim 9 wherein said cutting means comprises two pairs of roller shears arranged on the side of said carriage facing the band ends.

11. A machine as set forth in claim 10 wherein said welding means comprises a pair of welding rollers arranged on opposite sides of the overlapped band ends.

12. A machine as set forth in claim 11 wherein said mashing means comprises a pair of mashing rollers arranged on opposite sides of the overlapped band ends and arranged in the direction of movement of said carriage behind said welding rollers.

13. A machine as set forth in claim 9 wherein said welding means comprises a pair of welding rollers arranged on opposite sides of the overlapped band ends.

14. A machine as set forth in claim 9 wherein said mashing means comprises a pair of mashing rollers arranged on opposite sides of the overlapped band ends and arranged in the direction of movement of said carriage behind said welding means.

PO-1050
(5/69)

UNITED STATES PATENT OFFICE
CERTIFICATE OF CORRECTION

Patent No. 3,585,344        Dated June 15, 1971

Inventor(s) Hans Heymann et al

It is certified that error appears in the above-identified patent and that said Letters Patent are hereby corrected as shown below:

In the title page after line [45] the following should be inserted --- [73] Messer Griesheim GmbH, Frankfurt/Main, Germany, a corporation of Germany Column 2, line 22, "suitable" should be --- suitably ---

Column 3, line 37, "movable" should be --- movably ---

Column 3, line 43, "designed" should be --- designated ---

Column 3, line 57, --- acute --- should be inserted before "angle"

Column 4, line 2, "preferable" should be --- preferably ---

Column 4, line 23, "turnable" should be --- turnably

PO-1050 (5/69)

UNITED STATES PATENT OFFICE
CERTIFICATE OF CORRECTION

Patent No. 3,585,344      Dated June 15, 1971

Inventor(s) Hans Heymann et al      PAGE - 2

It is certified that error appears in the above-identified patent and that said Letters Patent are hereby corrected as shown below:

Column 4, line 32, "framed" should be

--- frames ---

Column 5, line 10, "designed" should be

--- designated ---

Column 7, line 29, "operating" should be

--- operation ---

Signed and sealed this 8th day of February 1972.

(SEAL)
Attest:

EDWARD M. FLETCHER, JR.
Attesting Officer

ROBERT GOTTSCHALK
Commissioner of Patents